United States Patent [19]

Sinclair et al.

[11] 4,019,334

[45] Apr. 26, 1977

[54] METHOD AND APPARATUS FOR MAKING SUBSEA PIPE CONNECTIONS

[75] Inventors: Albert R. Sinclair; Arthur C. Daughtry, both of Houston, Tex.; Thomas W. Childers, Mandeville; Joseph A. Burkhardt, New Orleans, both of La.

[73] Assignee: Exxon Production Research Company, Houston, Tex.

[22] Filed: Mar. 17, 1976

[21] Appl. No.: 667,758

[52] U.S. Cl. .................................. 61/110; 29/237; 61/111; 285/18

[51] Int. Cl.² ......................................... F16L 1/04

[58] Field of Search ................... 61/110, 111, 105; 285/18, DIG. 21, 24, 27; 29/237; 166/.5, .6; 251/63.6

[56] References Cited

UNITED STATES PATENTS

| | | | |
|---|---|---|---|
| 3,233,667 | 2/1966 | Van Winkle | 61/110 X |
| 3,481,396 | 12/1969 | Williams et al. | 285/18 X |
| 3,579,794 | 5/1971 | Powell | 29/237 |
| 3,717,920 | 2/1973 | Oliver et al. | 61/111 X |
| 3,843,168 | 10/1974 | Morrill et al. | 285/24 |

Primary Examiner—Dennis L. Taylor
Attorney, Agent, or Firm—John S. Schneider

[57] ABSTRACT

A subsea pipeline hub is connected to the hub of an adjacent spool piece connected to an in-place manifold of a subsea structure used in the production of oil and-/or gas. The pipeline hub is positioned relative to the opposing spool hub and a remotely operated pipeline connecting tool is lowered from the water's surface to the subsea structure using guidelines and structural guidance for alignment of the pipeline hub with the spool piece hub. The spool piece hub is then drawn to the pipeline hub and the hubs are clamped together by operation of the connecting tool. The seal in the connection can be tested by means of the connecting tool. The spool piece may be retrieved and replaced by the connecting tool if maintenance is needed. Connecting tool operations are powered by hydraulic fluid and controlled from the surface. The pipeline hub may be lowered vertically and pivoted into its position adjacent the spool piece or may be pulled into that position.

10 Claims, 16 Drawing Figures

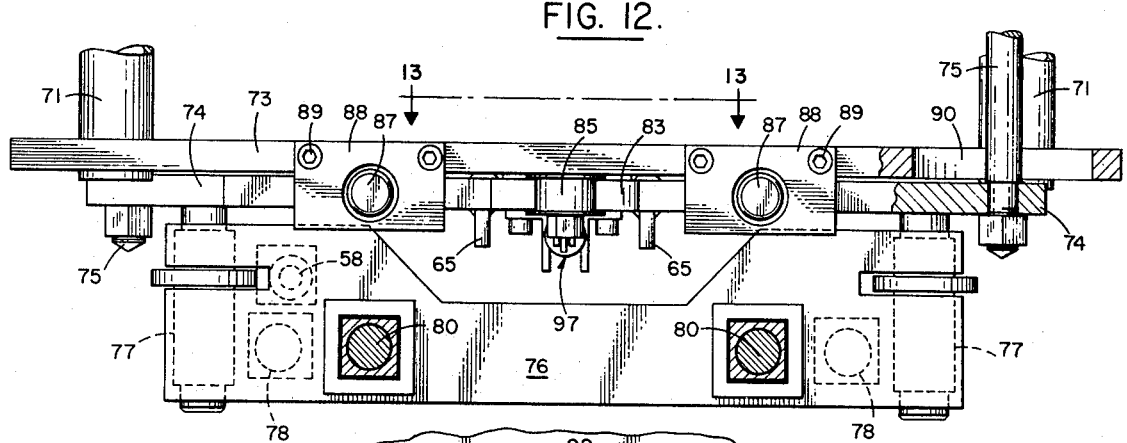
FIG. 12.
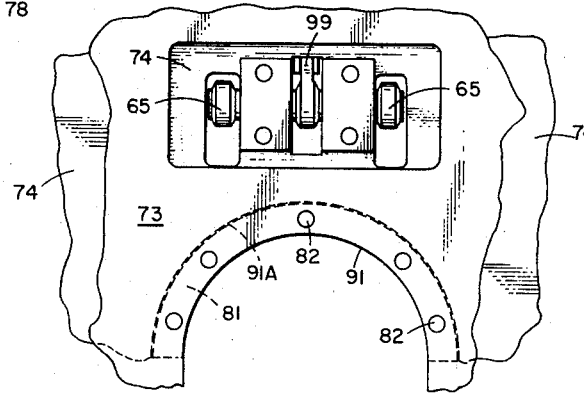
FIG. 13.
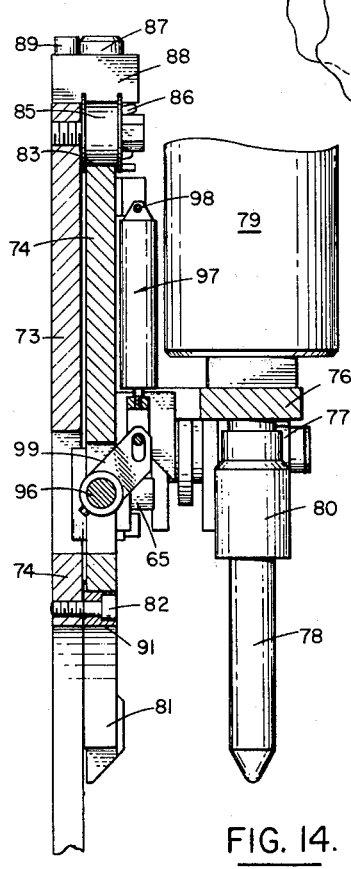
FIG. 14.
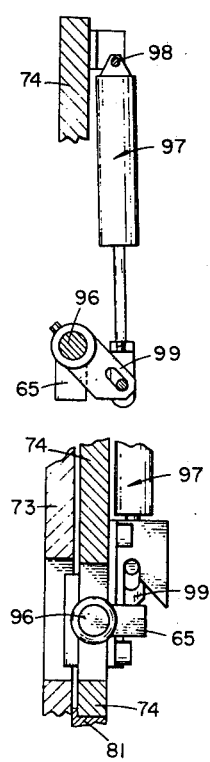
FIG. 16.
FIG. 15.

METHOD AND APPARATUS FOR MAKING SUBSEA PIPE CONNECTIONS

BACKGROUND OF THE INVENTION

The present invention relates to the remote connection of subsea flowlines and, in particular, to method and apparatus for connecting subsea pipelines to a submerged structure without the use of divers. More particularly, the invention concerns attaching subsea pipelines to subsea manifolds employing a connecting tool which is capable of aligning, clamping, testing and maintaining the connections between the pipelines and the manifold.

SUMMARY OF THE INVENTION

The present invention provides improved method and apparatus for connecting a spool piece hub, connected to the manifold of a subsea structure or template, to a pipeline hub. In the method a remotely operated pipeline connecting tool is lowered from a surface vessel to the template and properly positioned over the pipeline and manifold hubs. The connector tool is latched to the spool piece and the spool piece hub and pipeline hub are drawn together by hydraulic cylinders attached to sliding frames on the connecting tool. The hubs are then clamped together and pressure tested.

To retrieve a spool piece for replacement the connecting tool is lowered and latched onto the spool piece which is disconnected by unclamping the spool piece hubs from the manifold and pipeline hubs. The sliding frames on the connecting tool spread the manifold and pipeline hubs and the connecting tool is locked to the spool piece which is lifted from between the hubs and retrieved. All connecting tool operations except the alignments are surface controlled, hydraulic power fluid being supplied from a surface vessel.

Prior to lowering the connecting tool a section of the pipeline containing the pipeline hub and a trunnion assembly attached thereto is lowered vertically to adjacent the spool piece hub. As the pipeline hub and trunnion assembly are lowered additional sections of pipe are connected to the initial pipeline section attached to the trunnion assembly. Lowering the continues until the trunnion assembly latches to the template. Additional sections of pipe are laid out and during the laying operations the pipeline pivots 90° to the horizontal at the trunnion assembly which places the pipeline hub in final position for connection to the spool piece hub.

The apparatus for carrying out the method of the invention includes a spool piece having one spool piece hub adjacent said pipeline hub for connection thereto and the other hub thereof connected to a manifold hub which connects to a template; clamp means arranged on the spool piece hub for clamping the spool piece hub and pipeline hub together; and a remotely operated connecting tool having guidance frame means engageable with the manifold hub, landing frame means engageable with the pipeline hub, means connecting the guidance frame means and the landing frame means for moving the spool piece hub into connection with the pipeline hub; means for engaging the clamp means for operating the clamp means to clamp the spool piece hub and pipeline hub together and means for releasably locking the connector tool to the spool piece. In addition, conduit means are provided on the clamp means for supplying fluid to the connected hubs to test the connection and means are provided on the connecting tool for connecting the conduit means to a source of fluid. The spool piece may include a hydraulically operable valve, the operation thereof being controlled from the template through connections in the manifold and spool piece hubs.

Further, the apparatus includes two guide posts connected to guidelines; a pipeline section having a pipeline hub; a trunnion assembly attached to the pipeline section and containing guide funnels and a latch for latching onto the template.

BRIEF DESCRIPTION OF THE DRAWINGS

FIG. 12 is a top view of the wobble plate assembly shown in FIG. 11;

FIG. 13 is a view taken along lines 13—13 of FIG. 12;

FIG. 14 is a view taken along lines 14—14 of FIG. 11; and

FIGS. 15 and 16 are fragmentary views illustrating operation of the latch fingers.

DESCRIPTION OF THE PREFERRED EMBODIMENTS

Figure 1:
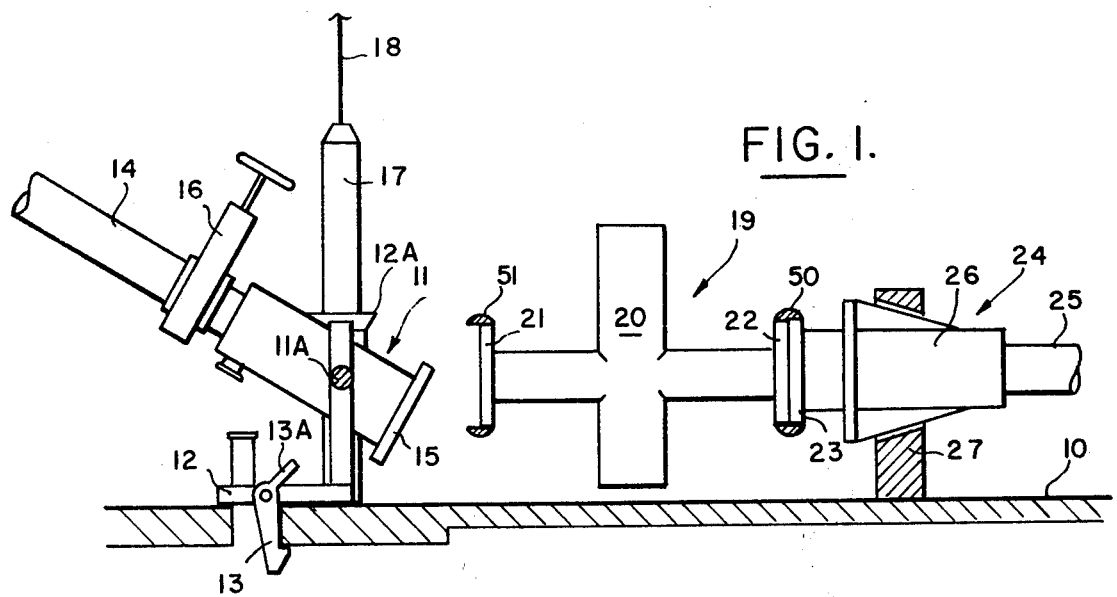
FIGS. 1 and 2 are schematic views of a pipeline hub being positioned on a subsea template in alignment with a spool piece hub in accordance with the method of the invention.
Figure 2:
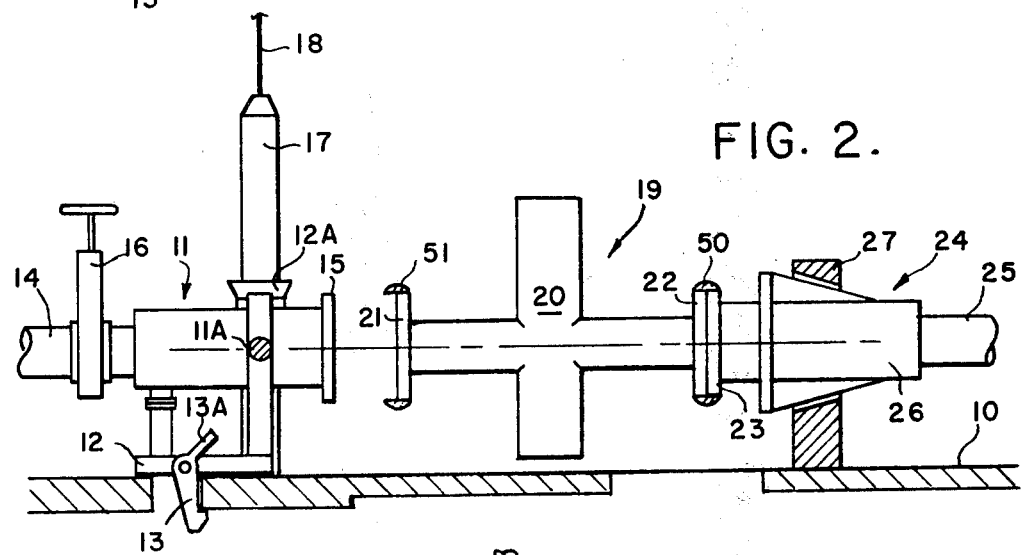

In FIG. 1 there is shown a subsea template 10 to which is latched a trunnion assembly 11 by latches 13 having latch releasing arms 13A and to which is pivotally attached by pins 11A a pipeline 14 with a connection hub 15. Trunnion assembly 11 also includes a base member 12, guide funnels 12A and other suitable securing means as, for example, tapered pins extending from base member 12 into holes in template 10, not shown, to fix trunnion assembly 11 on template 10. An isolation valve 16 is located on pipeline 14 adjacent trunnion assembly 11 on which pipeline 14 and hub 15 pivot relative to base member 12. Pipeline 14, hub 15 and trunnion assembly 11 are lowered into position on template 10 by two guide posts 17 positioned on template 10 and guide cables 18 connected to the guide posts. Base member 12 is latched to template 10 by latch 13, as shown. A valve spool piece 19 contains a valve 20 and a hub 21 to which hub 15 is to be connected and a hub 22 which is connected to a hub 23 of a manifold hub assembly 24 connected to manifold piping 24. Valve 20 is a balanced stem fail-safe valve such as described and claimed in U.S. No. 3,933,338 by D. P. Herd et al. Hub assembly 24 is supported by and shear pinned to a post 27 supporting cone end support 26. Hubs 22 and 23 are clamped together by a clamp assembly 50 and hub 21 is provided with a clamp assembly 51 which is used to clamp it to hub 15. Each clamp assembly is the type clamp connector described and claimed in U.S. Pat. No. 3,843,168 by C. D. Morrill et al. In FIG. 2 pipeline hub assembly 11 is shown pivoted into horizontal and properly aligned with valve spool 19 for connection of hubs 15 and 21.

Figure 3:
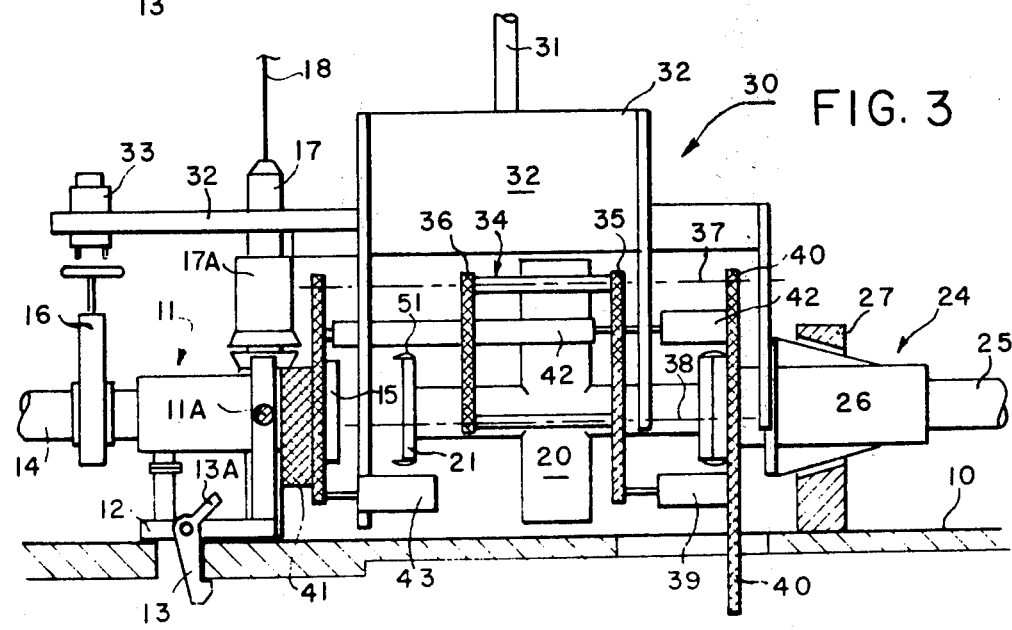
FIG. 3 is a schematic view of a remote pipeline connecting tool positioned on the pipeline and manifold hub assemblies for connecting the spool piece hub to the pipeline hub.

Referring to FIG. 3 a remote pipeline connecting tool 30 is lowered on drill pipe 31 from the water's surface guided by guide posts 17 and cables 18 and guide sleeves 17A on the connecting tool onto trunnion assembly 11 and manifold hub assembly 24. Connecting tool 30 includes a support frame 32 which provides structural support for the other components of the connecting tool. A valve operator 33 is supported on frame 32. A wobble plate assembly 34 includes vertical plate assemblies 35 and 36 slidably mounted on guide rods 37 and 38 which are secured to frame 32. A pair of piston-cylinder assemblies 39 connect plate 35 of wobble plate assembly 34 and a guidance frame 40. As shown, guidance frame 40 is positioned adjacent hub 23 of the manifold hub assembly 24. A landing frame 41, shown in landed position on trunnion assembly 11, is located adjacent hub 15. A pair of piston-cylinder assemblies 42 connect landing frame 41 and guidance frame 40. Guidance frame 40 is also slidably mounted on guide rods 37 and 38 while landing frame 41 is slidably mounted on guide rods 37. A pair of piston-cylinder assemblies 43 connect landing frame 41 and support frame 32 as shown. Connecting tool 30 in FIG. 3 is in position for moving hub 21 to hub 15.

Figure 4:
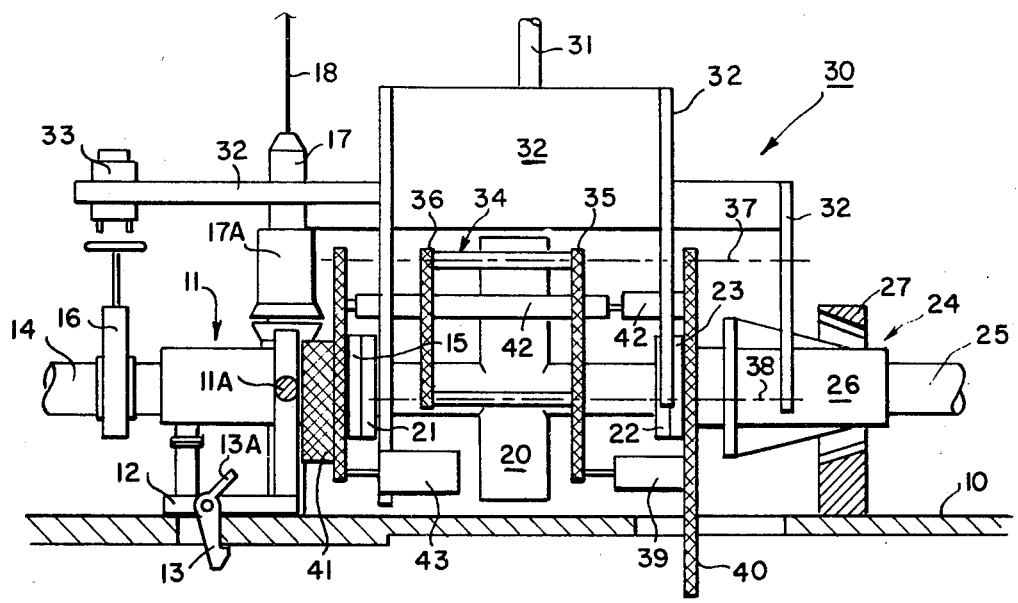
FIG. 4 is a schematic view of the spool piece hub clamped to the pipeline hub.

In FIG. 4 hubs 15 and 21 are shown made up and clamped together by clamp assembly 51 and valve actuator 33 is in position to open or close isolation valve 16. Manifold piping 25 contains a loop, not shown, that acts as a spring to allow manifold hub movement without overstressing the piping.

Figure 5:
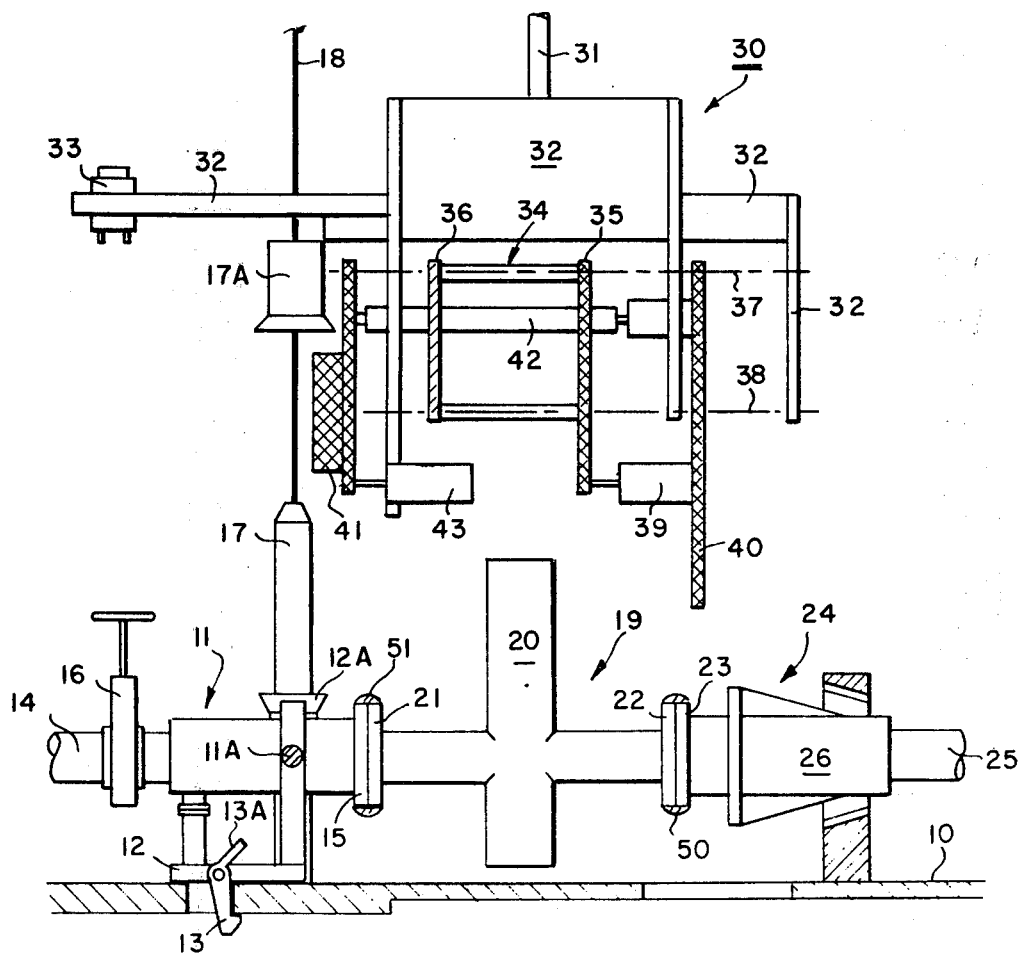
FIG. 5 is a schematic view illustrating recovery of the connecting tool.

In FIG. 5 connecting tool 30 is shown being retrieved to the surface following successful testing of the made up connection. FIG. 5 also illustrates lowering of connecting tool 30 into position on trunnion assembly 11 and the manifold hub assembly 24 for removal of spool piece 19.

Figure 6:
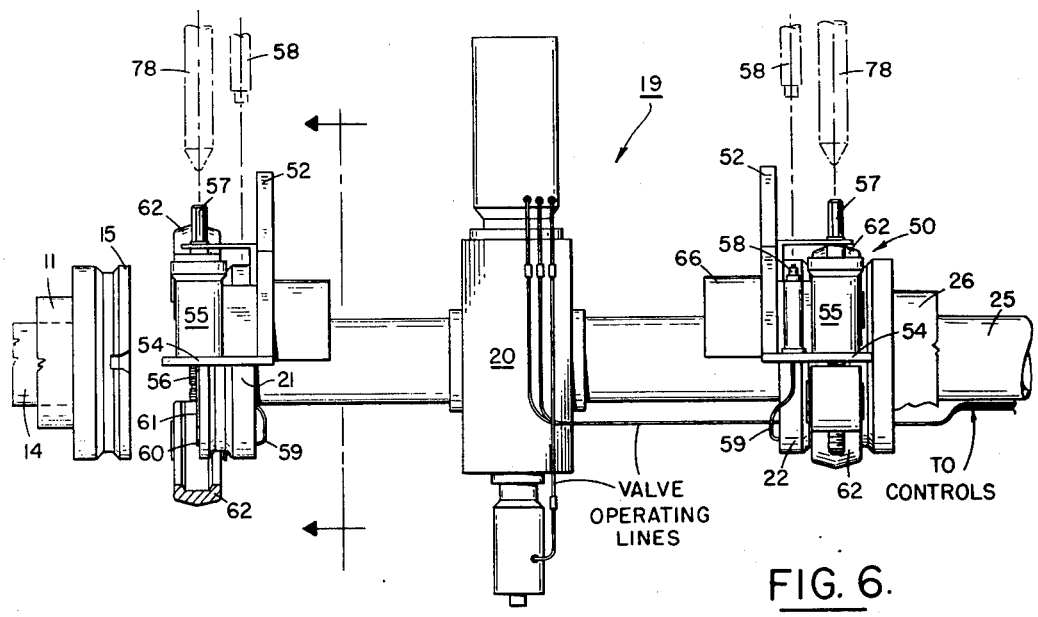
FIG. 6 is a side view which illustrates the apparatus for clamping the spool piece hub to the pipeline and manifold hubs.
Figure 7:
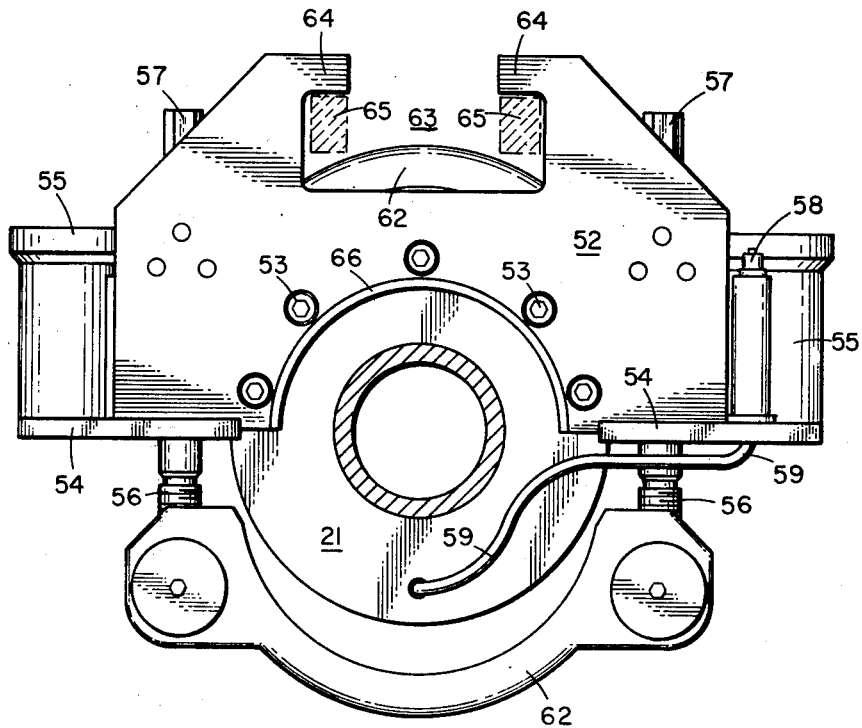
FIG. 7 is a view taken along lines 7—7 of FIG. 6.

Referring now to FIGS. 6 and 7 in which the details of spool piece 19 and clamp assemblies 50 and 51 on hubs 21 and 22 are illustrated. Clamp assemblies 50 and 51 each include a vertical plate 52 bolted to each hub 21 and 22 by bolts 53. A pair of horizontal plates 54 on each clamp assembly support a pair of guide sleeves 55 and clamp operating rods 56 which are provided with hex shaped wrench heads 57. Also supported on one of the horizontal plates 54 is the male half of test hydraulic connector 58 which is connected by a conduit 59 to a port, not shown, on each hub 21 and 22 between seals 60 and 61 (indicated on the contacting surface face of hub 21). Clamp halves 62 are shown threaded onto rods 56. The clamp assemblies are in closed position on hub 22 and in the open position on hub 21. A semicircular saddle sleeve 66 is fixed to the back of plate 52.

Plate 52 has an opening 63 at its upper end forming lug ears 64 which are shown engaged by latch fingers 65 (see FIG. 7).

Figure 8:
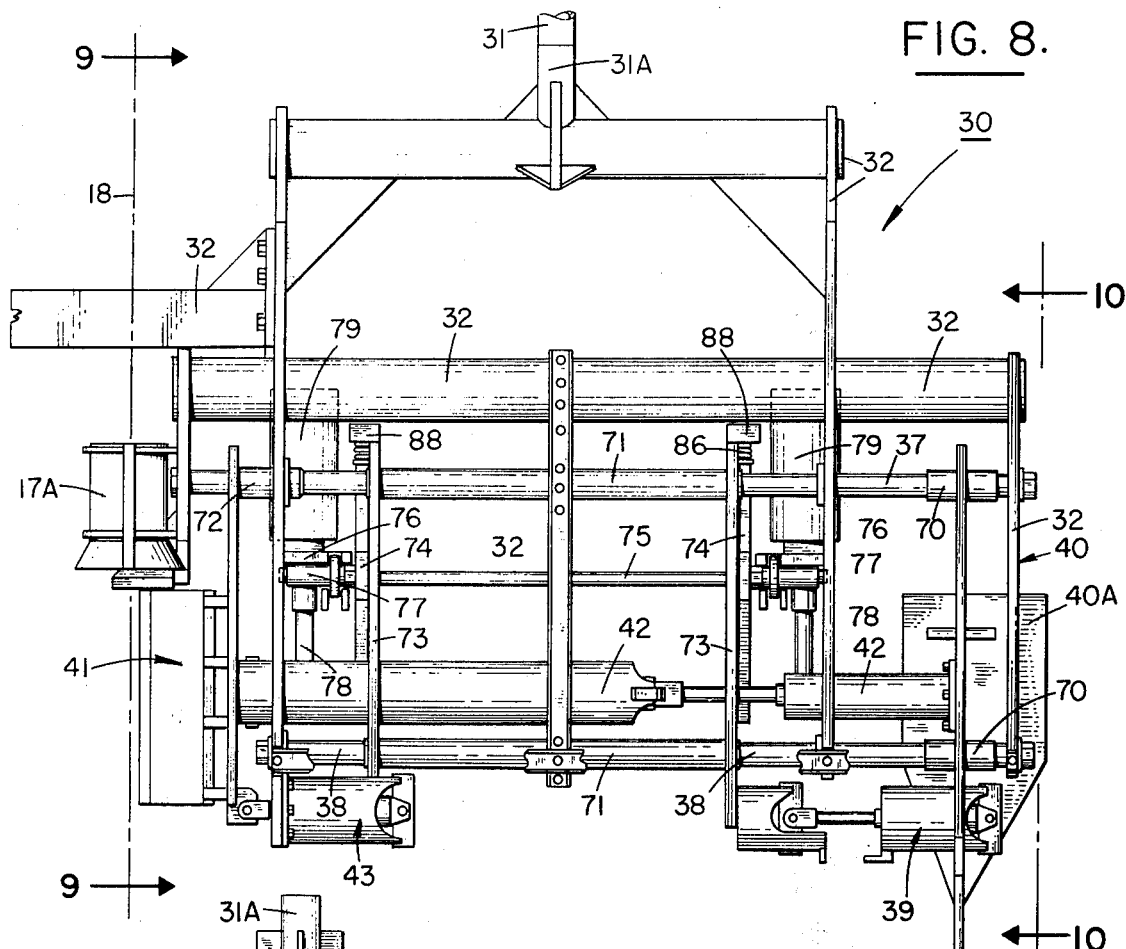
FIG. 8 is a view illustrating details of the connecting tool.
Figures 9, 10:
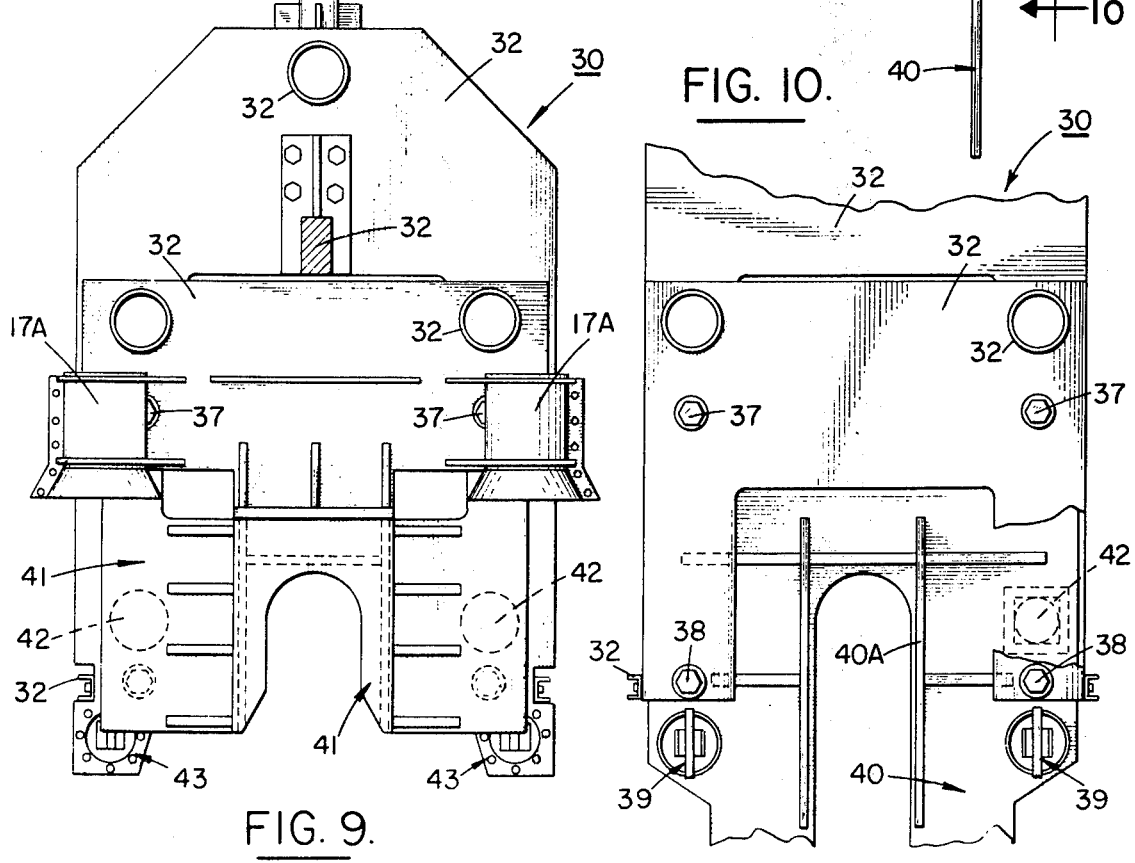
FIG. 9 is a view taken along lines 9—9 of FIG. 8.
FIG. 10 is a view taken along lines 10—10 of FIG. 8.

Guidance frame 40, as seen in FIGS. 8 through 10, includes guide yoke 40A, the lower tapered, wedge-shaped portion of which aids in moving manifold hub assembly 24 into proper position with respect to spool piece 19. Each plate assembly 35 and 36 includes a plate 73 and a wobble plate 74, the latter being pulled against plate 73 by tie rods 75. Guidance frame 40 is attached to sleeves 70 which slide on guide rods 37 and 38. Plates 73 of wobble plate assembly 34 are attached to sleeves 71 which slide on guide rods 37 and 38. Landing frame 41 is attached to sleeves 72 which slide on upper guide rods 37. A plate 76 is movably mounted on a roller 77 which is attached to each wobble plate 74. Attached to the underside of each plate 76 are downwardly extending guide pins 78. Each plate 76 also has a pair of torque motors 79 attached to it.

Figure 11:
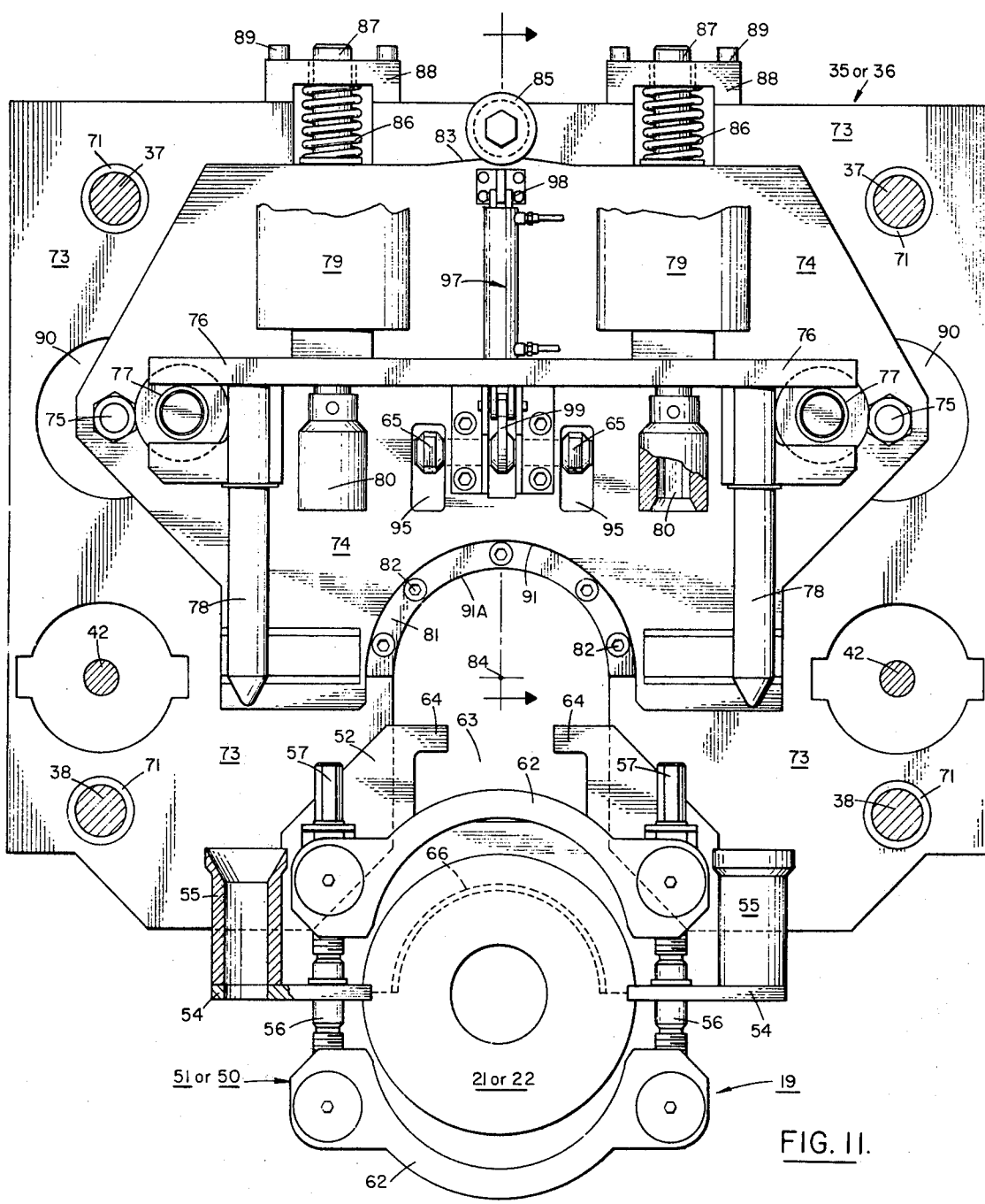
FIG. 11 is a fragmentary view illustrating one of the wobble plate assemblies positioned adjacent the spool piece hub.

In FIG. 11 it is seen that each motor 79 is attached to a wrench 80 which extends below plate 76 and is positioned to engage a hex head 57 of the clamp assemblies. Each wobble plate 74 sits on a semicircular shoulder 81 attached to plate 73 by bolts 82. The center portion 83 of the upper surface of each wobble plate 74 is formed as a curved surface having a center point 84 which is also the center point for the semicircular surface 91 on shoulder 81. A roller 85 is mounted on plate 73 and bears against curved surface 83. A pair of centering springs 86 surround pins 87 which are attached to the upper end of plate 74 and extend through spring retainer boxes 88 which are attached to plate 73 by bolts 89. Each of the two tie rods 75 extend through an enlarged opening 90 in plate 73. The limited movement afforded by the mountings of plates 74 and 76 permits adjustments in aligning guide sleeves 55 with guide pins 78 and hex heads 57 with wrenches 80. When the wobble plates are lowered into position on valve spool 19 surfaces 91A engage saddle sleeves 66. In that position of connecting tool 30 guide pins 78 are aligned in sleeves 55 and wrenches 80 engage wrench heads 57.

Referring to FIGS. 12 through 16, in which details of the latch assemblies are shown, latch pins 65 are mounted in openings 95 on a rod 96 which is mounted for rotation in each wobble plate 74. A piston-cylinder assembly 97 is pivotally connected at one end to wobble plate 74, as at 98, and at the other end to link arm 99 which is also attached to rod 96. When shoulder 81 engages saddle sleeve 66 (see FIG. 11) latch fingers 65 are in position within opening 63 to be extended and engage underneath ears 64. Once so extended, spring fingers 76 lock connecting tool 30 to spool piece 19.

In operation, after guide posts 17 and guidelines 18 are installed at a prepared location on template 10 trunnion assembly 11, with pipeline 14 and hub 15 attached, is lowered with guidelines 18 within the two guide funnels 12A of the trunnion assembly. As trunnion assembly 11 is lowered additional sections of pipe are joined to the original pipeline section. Addition of pipe sections continues until guide funnels 12A slide over guide posts 17. Lowering continues until latches 13 latch trunnion assembly 11 to template 10. An additional sections of pipeline are laid out pipeline section 14 is pivoted 90° from vertical to horizontal which places pipeline hub 15 in final position for connection to spool piece hub 21.

Connecting tool 30 is then lowered with guidelines 18 within guide sleeves 17A to guide posts 17 where initial alignment is achieved. As lowering continues guidance yoke 40A of guidance frame 40 engages manifold hub assembly 24 between hub 23 and cone-shaped support 26. The three points of alignment, the two guide posts and the manifold hub correctly position connecting tool 30 over pipeline hub 15 and spool piece hub 21. Lowering continues and the weight of connecting tool 30 is landed on trunnion assembly 11 by landing frame 41. The hydraulically powered landing frame 41 is retracted by piston-cylinders 43 and the entire connecting tool 30 drops from its landing point into position for pipeline connection. During the last downward movement wobble plate assembly 34 permits final alignment of guide pins 78 and sleeves 55. Latch fingers 65 are activated to lock connecting tool 30 and spool piece 19 together. Spool piece hub 21 and pipeline hub 15 are drawn together by hydraulic cylinder assemblies 42 attached to sliding guidance and landing frames 40 and 41, respectively, of connecting tool 30. Movement of manifold piping 25 toward pipeline hub 15 disconnects the manifold piping 25 from post 27 by shearing the pins connecting them. The female half of connector 58 on hydraulic connecting tool 30 is extended to connect with the male half of hydraulic connector 58 on clamp assembly 51, the seals between hubs 15 and 21 are then tested for pressure integrity. A suitable hydraulic connector 58 may be that disclosed and claimed in U.S. Pat. No. 3,918,485 by R. A. Weber et al. After a good pressure test and on command from the surface connecting tool 30 opens manual isolation valve 16 and releases latch fingers 65 from spool piece 19. The tool is retrieved to the surface, guidelines are retrieved and the connection is complete.

To retrieve a spool piece for replacement, connecting tool 30 is lowered and latched onto the installed spool piece 19. Spool piece 19 is disconnected from the manifold and pipeline hubs by operation of torque motors 79 to release clamp assemblies 50 and 51 and by operation of piston-cylinder assemblies 39 and 43 to move guidance frame 40 and landing frame 41 to spread the manifold and pipeline hubs. The wobble plate assembly 34 is centered and spool piece 19 is lifted from between the hubs and connecting tool 30 is retrieved.

In U.S. Pat. No. 3,775,986 entitled "Method and Apparatus of Making Remote Pipeline Connections" a "pull-in" method to align subsea pipelines is disclosed and claimed. The method of the present invention for connecting the pipeline hub to the spool piece hub may also be used with that "pull-in" method once the pipeline hub and spool piece hub are properly positioned and aligned.

Spool piece 19 may be, as described, a valve spool or it may be a pipe, control pod or any other maintainable component. Also, the method for connecting the pipelines may be conducted from a floating vessel or grounded platform. Further, instead of guidelines to guide the trunnion assembly and connecting tool into proper position other known guiding techniques, such as the acoustic positioning technique, may be used. Other changes and modifications may be made in the illustrative embodiments of the invention shown and/or described herein without departing from the scope of the invention as defined in the appended claims.

Having fully described the nature, operation, advantages and apparatus of our invention we claim:

1. A method for connecting a spool piece hub, connected to a subsea structure manifold, to a fixed pipeline hub aligned for connection to said spool piece hub comprising the steps of:

lowering a remotely operated connecting tool from the water's surface;

guiding said connecting tool onto said pipeline and said manifold;

latching said connecting tool to said spool piece;

moving said spool piece hub by means of said connecting tool into engagement with said pipeline hub; and clamping said engaged hubs together by means of said connecting tool.

2. A method as recited in claim 1 including supplying test fluid to said hub connection to test the seals therebetween.

3. A method as recited in claim 2 including unlatching said connecting tool from said spool piece and retrieving said connecting tool.

4. A method as recited in claim 3 in which prior to lowering said connecting tool from the water's surface lowering said pipeline hub attached to a pivotal trunnion assembly from the water's surface vertically; guiding said trunnion assembly to a prepared location on said subsea structure and releasably securing said trunnion assembly to said subsea structure, said pipeline hub being rotated from said vertical position to a horizontal position and into alignment position with said spool hub as additional sections of pipe are added from a pipe laying vessel.

5. Apparatus for connecting a spool hub, connecting to a subsea structure manifold, to a fixed pipeline hub aligned for connection with said spool hub comprising:

clamp means arranged on said spool hub for clamping said spool hub and pipeline hub together; and a remotely operated connector tool including:

guidance means engageable with said manifold;

landing means engageable with said pipeline hub;

means connecting said guidance means and said landing means for moving said spool hub into engagement with said pipeline hub;

means for engaging said clamp means for operating said clamp means to clamp said spool piece hub and pipeline hub together; and means for releasably locking said connector tool to said spool piece.

6. Apparatus as recited in claim 5 including conduit means associated with said clamp means for supplying test fluid to said clamped hubs and means on said connecting tool for connecting said conduit means to a source of test fluid to test the connection between said hubs.

7. Apparatus as recited in claim 6 including a pivotal trunnion connected to said pipeline hub and releasable means securing said turnnion assembly to said subsea structure.

8. Apparatus as recited in claim 7 wherein said spool piece comprises a valve spool.

9. Apparatus as recited in claim 8 including a manifold hub on said manifold and said guidance means including a yoke for engaging said manifold hub.

10. Apparatus as recited in claim 9 in which said connecting tool includes spaced apart adjustable plates engaging said spool piece, said plates containing guide means, wrench means, and motor means for operating said wrench means; and said spool piece containing guide posts engageable with said guide means and said clamp means containing wrench heads engageable with said wrench means.

* * * * *